June 7, 1966  T. H. SHELLEY  3,254,411
TOOTH CAVITY FILLING AND METHOD OF FILLING TEETH
Filed Nov. 5, 1962
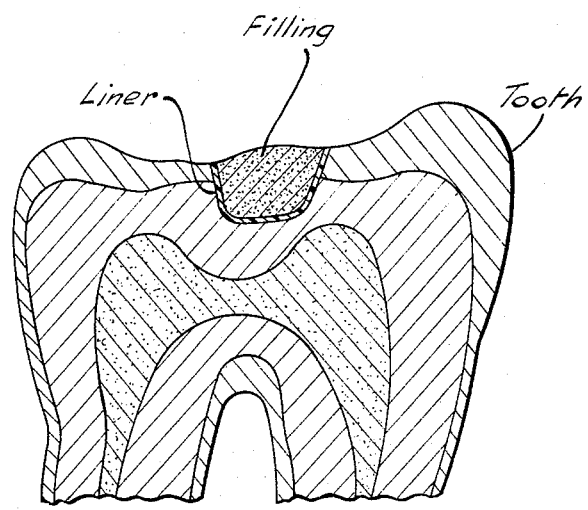
INVENTOR.
THOMAS H. SHELLEY
BY
ATTORNEY

3,254,411
TOOTH CAVITY FILLING AND METHOD OF FILLING TEETH

Thomas H. Shelley, East Brunswick, N.J., assignor to Johnson & Johnson, a corporation of New Jersey
Filed Nov. 5, 1962, Ser. No. 235,506
17 Claims. (Cl. 32—15)

The present invention relates to the filling of teeth and more particularly to cavity linings and the prevention of leakage around tooth fillings.

When decay is noted in a tooth, the dentist removes the decay, cleans out the cavity in the tooth formed by such removal and then shapes the cavity to the best form for receiving a filling material which is used to build the tooth back to its previous form. Conventional filling materials are, for example, amalgam fillings, acrylate fillings, and silicate fillings. One of the difficulties involved with filled teeth, however, is that leakage frequently occurs between the filling and the tooth after the tooth has been filled, with the result that bacteria seep into the tooth cavity causing decay under the filling. This necessitates removal of the filling and the decay so formed with the result that a still larger cavity is created which must be filled, the cycle repeating itself with the eventual destruction of the tooth.

In filling teeth, particularly where filling deeper cavities, it is generally accepted practice to line the floor and walls of the cavity with a lining or base material prior to filling. These materials are generally solutions of film-forming materials, such, for example, as cellulose nitrate, that form films on evaporation of the solvent and involve no cure. However, even where the cavity has first been so lined, leakage still occurs. It has now been discovered that leaking around the edge of the filling and into the tooth can be prevented if, as a liner, a polyurethane resin coating is used.

In preparing the tooth for the filling, in accordance with the present invention, after the tooth decay has been removed and the cavity cleaned and shaped for reception of the filling, the cavity is dried and the walls of the cavity then coated with a thin layer of urethane prepolymer mixed with a catalyst for polymerizing the same. The coating is then permitted to set for a sufficient time for the same to cure from a liquid to a partially or fully polymerized elastomeric polyurethane film, after which the filling material is inserted and compacted in the conventional manner. The polyurethane coating makes an excellent cavity liner substantially preventing any leakage from occurring between the filling and the cavity wall and thus sealing the cavity to the ingress of bacteria.

The drawing illustrates, in cross section, a tooth having a cavity filled with a filling and a liner incorporating the invention.

In the practice of the present invention, a prepolymer of the polyurethane resin is placed on a mixing surface and a few drops of the polymerizing catalyst added. The solvent used for the catalyst is preferably a fairly highly volatile solvent so that most of the solvent can be evaporated prior to blending the catalyst with the prepolymer. However, it is not necessary that the solvent be evaporated prior to blending and coating and solvents of lower volatility may be used. In the preferred practice, after most of the solvent has evaporated, the catalyst and prepolymer are mixed together, as with a spatula, and the mix of prepolymer and catalyst then used to coat the floor and walls of the tooth cavity. As previously stated, the cavity should be dried prior to coating with the prepolymer-catalyst mix. The liner may be coated onto the cavity floor and walls with any instrument such as a dental probe or a brush. The particular technique of spreading the coating on the cavity wall will depend on the preference of the dentist using the same.

In practicing the present invention, it is preferred that the prepolymer and catalyst mix be converted from a liquid to a slightly tacky elastomeric material in a period of about three to ten minutes, the liner then being ready to receive the filling. If the polyurethane cures too rapidly, a satisfactory leak-proof lining is difficult to obtain, the lining material being difficult to handle because conversion from liquid to solid is too rapid. If the curing time is too long, too much time delay is involved in filling the tooth. This results in inconvenience to the patient and the dentist.

The polyurethane liners do not appear to be limited in their application to any particular filling material but act as excellent sealants for any of the conventional fillings such as silver amalgam, self-curing acrylic filling resins and silicate cement restorative materials.

In practicing the present invention, a cavity in a tooth to be filled is prepared and dried with air in the conventional manner. A small amount of the urethane prepolymer is placed on a mixing surface, such as a flat glass surface, and a few drops of catalyst solution are then mixed therewith. Using any desired instrument, such, for example, as a brush or the tine of a dental explorer, a small amount of the prepolymer-catalyst blend is transferred to the tooth cavity and spread over the walls and floor of the cavity, care being taken to completely cover the walls and floor. The prepolymer-catalyst mix may also cover the enamel, though preferably in a thinner film than where covering the dentine. The mix of catalyst, where, for example, triethylenediamine catalyst is used, and prepolymer should be such that the mix contains about 1.3% to about 1.8% by weight of the catalyst. This amount is obtained by adding from about 5 to 7 drops (using a standard 2 ml. medicine dropper) of a 10% solution of the catalyst to about 0.6 gram of the prepolymer.

After the cavity walls have been coated with the prepolymer-catalyst mix, the prepolymer is permitted to set for a period of about five minutes after which time it will have polymerized to a polyurethane film which is elastic and slightly tacky in nature. During the coating procedure, which is performed right after mixing the catalyst and prepolymer, the catalyst-prepolymer mix is quite fluid, being only sufficiently viscous to permit its ready transfer with a probe or brush to the cavity being coated. Within a few minutes the viscosity becomes extremely high as polyurethane formation proceeds.

As the prepolymer-catalyst mix is substantially colorless, in many instances it is desirable to add a small amount of zinc oxide to give color to the lining composition. This enables the dentist to see more readily whether or not the cavity walls have been completely coated. The addition of the zinc oxide, which generally is included in amounts of about 25–35% by weight of the total mix, appears to have no deleterious effect on the lining.

The coating of the prepolymer catalyst mix can be of the same order of thickness generally used in making filling linings with conventional materials. Thicknesses in the order of about 1 to 3 mils are found to be satisfactory.

After the urethane prepolymer catalyst mix has polymerized into the resilient, slightly tacky, polyurethane coating, the filling material is inserted in the conventional manner. In the preferred practice, the filling is inserted after the lining has partially cured into a resilient film but prior to complete cure. However, it is found that even on complete cure the urethane polymer liner will give an excellent seal against leakage into the dentine, even though the filling may be placed in the cavity several hours after the lining has been placed on the cavity walls.

In order to demonstrate the effectiveness of the polyurethane linings in preventing leakage around the margins of filling materials, numerous teeth, both bovine and human, were filled using silver amalgam, self-curing acrylic, and silicate cement restorative filling materials. Teeth were filled using no liner, using commercially available lining materials, and using polyurethane liners in accordance with the present invention.

In filling the teeth, Class 5 cavities are prepared and the tooth then filled. After filling, the teeth are polished so that the top surface of the edge of the filling and the surface of the tooth at the filling edge are even. The teeth are then immersed in about .9% saline solution for several days after which they are put through an alternating hot-cold cycling treatment. In this treatment the tooth is first immersed in a water bath having a temperature of 4–10° C. where it remains for one minute, after which it is removed and then placed in a water bath having a temperature of 50–60° C. where it remains for one minute, completing the first cycle. The tooth is then again immersed in the lower temperature water bath starting a new cycle, each complete cycle lasting two minutes. This treatment is continued for 150 cycles, after which the tooth is dried and waxed prior to being given a dye penetration test. Any wax which will prevent leakage through faults in the tooth may be used. Kerrs Sticky Wax has been found suitable for this purpose. The wax is applied so as to cover the entire surface of the tooth except for a peripheral area around the margin of the filling about 1 to 2 mm. away from the filling edge. The tooth is then placed in a dye bath comprising a 5% aqueous solution of basic fuchsin. The tooth remains in the dye bath at room temperature for 24 hours, after which it is removed, dryed, and sliced into 4 to 5 semi-serial sections made parallel to the long axis of the tooth. These sliced sections are then examined to determine whether any of the dye solution has penetrated into the tooth through the filling area.

On examination, teeth treated in the manner described show that the polyurethane lining substantially prevents leakage from occurring around the filling in the restoration area and passing into the dentine, while substantial leakage occurs with fillings prepared with no lining and with fillings prepared with the conventional lining materials. This is found to be the case regardless of the filling materials used. The preferred urethane prepolymers are those resulting from the reaction of toluene diisocyanate and the polypropylene glycols or polyoxypropylene triols. The following are illustrative urethane prepolymers used in the lining of tooth cavities in accordance with the present invention. These, however, are given for the purpose of illustration only and the invention is not limited thereto:

PREPOLYMER A

Commercial toluene diisocyanate (80 percent 2,4-isomer and 20 percent 2,6-isomer) and a polypropylene glycol with a molecular weight of approximately 2000 (hydroxyl number 55.9 mg. KOH/gram) are condensed to form a prepolymer. This prepolymer can best be described by the following formula wherein $n$ is about 30 to 35.

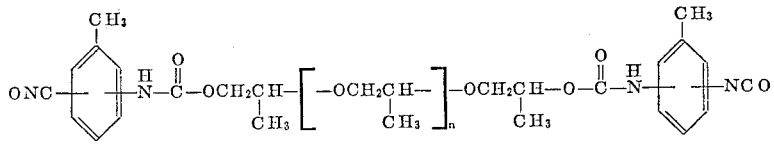 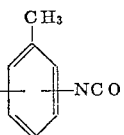

The reaction is carried out in a 500-ml., three-neck flask fitted with a mechanical stirrer, a thermometer, a condenser, and an inlet tube for bubbling dry nitrogen through the reaction mixture. Toluene diisocyanate (37 grams; 0.212 mole) and 201 grams (0.099 mole) of polypropylene glycol is placed in the flask, stirred, and heated at 95° C. for four hours, while sweeping a slow stream of nitrogen through the reaction mixture.

At the end of the reaction period, the mixture is analyzed for isocyanate groups; NCO found is about 3.80 percent. The product is a pale-yellow, viscous liquid having a viscosity of about 5000 centipoises at 25° C.

PREPOLYMER B

Toluene diisocyanate (42 grams; 0.241 mole) and 200 grams (0.083 mole) of a urethane triol, such as Niax Urethane Grade Triol LHT–67 (hydroxyl number 69.9 mg. KOH/gram) are stirred and heated at 100–105° C. for 3.5 hours. The isocyanate group concentration of the reaction mixture at the end of the reaction period is 3.67 percent. The prepolymer is pale yellow and somewhat more viscous than Prepolymer A.

PREPOLYMER C

Toluene diisocyanate (35.8 grams; 0.206 mole) and 200 grams (0.061 mole) of a urethane triol, such as Niax Urethane Grade Triol LM–52 (hydroxyl number, 51.2 mg. KOH/gram) are stirred and heated at 100–105° C. for 3.25 hours. The concentration of isocyanate groups in the reaction mixture at the end of the reaction period is 3.60 percent. The prepolymer is similar to Prepolymer B in appearance.

The triols used in making Prepolymers B and C are made by Union Carbide Chemicals Corporation. Although specific polyoxypropylene triols are illustrated in the making of Prepolymers B and C, polyoxypropylene triols having hydroxy numbers of from about 30 to 170 mg. KOH/gram are found to be suitable.

As the rate of cure for a practical polyurethane liner is important, 1,4-diaza-[2,2,2]-bicyclooctane, commonly known as triethylenediamine, is preferred as the catalyst since this gives a substantially more rapid rate of cure than many of the conventional catalysts used for curing polyurethane resins.

The triethylenediamine catalyst is dissolved in urethane grade ethyl acetate to give a solution of about 10 percent concentration of the catalyst. If desired, other solvents may be used in place of the ethyl acetate solution, such, for example, as acetone, chloroform, and Cellosolve acetate (2-methoxyethyl acetate).

Where a faster rate of cure is desired, it has been found that a more rapidly curing polyurethane can be obtained, while still obtaining an excellent cavity lining, by blending with the triethylenediamine a tetrol, such, for example, as TKED [N,N,N',N'-tetrakis(2-hydroxyethyl)ethylenediamine] and then using this mix, instead of the catalyst solution, to cure the urethane prepolymer. The tetrol may be added in varying amounts depending on the speed of cure desired. However, as the tetrol reacts with the prepolymer, it is generally preferred that the amount of tetrol not exceed such amount that would react with more than about half of the NCO group in the prepolymer.

The following example further illustrates the excellent sealing of fillings against leakage obtained by practicing the present invention.

Teeth are filled with silver amalgam fillings, self-curing acrylic fillings, and with silicate cement restorative filling material. These teeth are then tested in the manner heretofore described to determine the degree of seal obtained. Using as controls, teeth filled with the same filling materials but unlined and teeth with the same materials lined with conventional commercially available liners, it is shown that the teeth lined with the polyurethane lining are substantially free from leakage while the unlined teeth and teeth lined with the conventional lining materials in each instance show substantial leakage. The most severe leakage is observed with the acrylic fillings. The following tables tabulate visual observation of the amount of leakage observed in sections made in tested teeth lined with polyurethane Prepolymer A.

*Table I.—Dye penetration tests with bovine teeth*

| Liner | Filling | Appearance of Sectioned Tooth |
|---|---|---|
| None | Silicate | Substantial leakage. |
| Popular Commercial Liner | ___do___ | Do. |
| Polyurethane | ___do___ | No leakage. |
| Polyurethane with ZnO | ___do___ | Do. |
| None | Silver Amalgam | Substantial leakage. |
| Popular Commercial Liner | ___do___ | Some leakage. |
| Polyurethane | ___do___ | No leakage. |
| Polyurethane with ZnO | ___do___ | Do. |
| None | Acrylic | Extremely bad leakage. |
| Popular Commercial Liner | ___do___ | Do. |
| Polyurethane | ___do___ | Slight leakage. |
| Polyurethane with ZnO | ___do___ | Do. |

*Table II.—Dye penetration tests with human and bovine teeth*

| Type of Tooth | Liner | Filling | Appearance of Sectioned Tooth |
|---|---|---|---|
| Bovine | None | Silicate | Substantial leakage. |
| Do | Polyurethane | ___do___ | No leakage. |
| Do | Polyurethane with ZnO | ___do___ | Do. |
| Human | None | ___do___ | Substantial leakage. |
| Do | Polyurethane | ___do___ | Slight leakage. |
| Do | Polyurethane with ZnO | ___do___ | No leakage. |
| Bovine | None | Silver Amalgam | Substantial leakage. |
| Do | Polyurethane | ___do___ | No leakage. |
| Do | Polyurethane with ZnO | ___do___ | Do. |
| Human | None | ___do___ | Substantial leakage. |
| Do | Polyurethane | ___do___ | No leakage. |
| Do | Polyurethane with ZnO | ___do___ | Do. |
| Bovine | None | Acrylic | Substantial leakage. |
| Do | Polyurethane | ___do___ | Very slight leakage. |
| Do | Polyurethane with ZnO | ___do___ | Do. |
| Human | None | ___do___ | Slight leakage. |
| Do | Polyurethane | ___do___ | No leakage. |
| Do | Polyurethane with ZnO | ___do___ | Do. |

Tests made on animals to determine sensitivity to the urethane prepolymer-catalyst mix with and without zinc oxide indicated no sensitivity to these materials. In these tests some of the prepolymer-catalyst mix was implanted under the skin of rats and no deleterious effects were noted after 7 days. Also, when used as liners in the filling of the teeth of live dogs, no deleterious effects were observed to result from the presence of the polyurethane material, the same apparently being completely nontoxic insofar as the tests indicate.

Having thus described my invention, I claim:

1. The method of filling a cavity in a tooth comprising mixing a urethane prepolymer with a polymerization catalyst for said prepolymer, coating the walls of said cavity with said prepolymer-catalyst mix, letting said coating cure to a highly polymeric non-fluid state and then filling said cavity with a tooth-filling material.

2. The method of claim 1 wherein said urethane prepolymer has admixed therewith an inert filler to color the same.

3. The method of claim 2 wherein said filler is zinc oxide.

4. The method of claim 3 wherein said zinc oxide is present in amounts of 25–35% by weight of said urethane prepolymer on a solids basis.

5. The method of claim 1 in which said catalyst is triethylenediamine.

6. The method of claim 1 in which said catalyst is a mixture of triethylenediamine and a tetrol.

7. The method of claim 6 in which said tetrol is N,N,N',N'-tetrakis(2-hydroxyethyl)ethylenediamine.

8. The method of claim 1 in which said catalyst is in a highly volatile solvent.

9. The method of claim 1 wherein the prepolymer is the reaction product of toluene diisocyanate and a material selected from the group consisting of polypropylene glycol and a urethane grade triol.

10. The method of claim 9 in which said urethane grade triol has a hydroxyl member of about 30 to 170 mg. KOH/gram.

11. The method of claim 9 in which said catalyst is triethylenediamine.

12. The method of claim 9 in which said catalyst is a mixture of triethylenediamine and a tetrol.

13. The method of claim 12 in which said tetrol is N,N,N',N'-tetrakis(2-hydroxyethyl)ethylenediamine.

14. The method of claim 1 wherein the prepolymer is the reaction product of toluene diisocyanate and a polypropylene glycol described by the general formula:

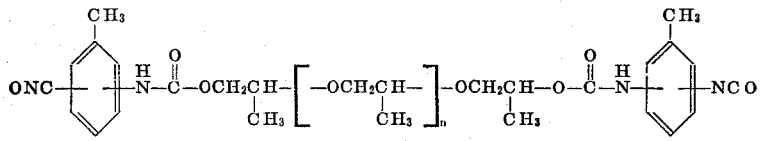

wherein $n$ is a number of about 30 to 35.

15. A tooth cavity filling comprising a tooth cavity filling material having bonded thereto a cured polyurethane film tooth cavity liner.

16. A tooth cavity filling in accordance with claim 15 in which said film liner contains 25 to 35 percent by weight of zinc oxide.

17. A tooth cavity filling in accordance with claim 15 in which said tooth cavity filling material is selected from the group consisting of silver amalgam, self-curing acrylic resins, and silicate cement restorative materials.

References Cited by the Examiner

UNITED STATES PATENTS

| | | | |
|---|---|---|---|
| 2,036,728 | 4/1936 | Simon | 32—15 |
| 2,154,413 | 4/1939 | Schlesinger | 32—15 |
| 3,050,482 | 8/1962 | Cobb | 260—77.5 |
| 3,058,955 | 10/1962 | Neumann | 260—77.5 |

RICHARD A. GAUDET, *Primary Examiner.*

ROBERT E. MORGAN, *Examiner.*